United States Patent
Myers

(10) Patent No.: US 7,195,425 B2
(45) Date of Patent: Mar. 27, 2007

(54) METHOD TO PRODUCE LANDFILL DAILY COVER FROM SEWER SLUDGE AND MSW

(76) Inventor: Randal B Myers, 6790 Woodland, Zachary, LA (US) 70791

( * ) Notice: Subject to any disclaimer, the term of this patent is extended or adjusted under 35 U.S.C. 154(b) by 0 days.

(21) Appl. No.: 11/002,449

(22) Filed: Dec. 2, 2004

(65) Prior Publication Data

US 2006/0120807 A1    Jun. 8, 2006

(51) Int. Cl.
   *B09B 1/00*   (2006.01)
(52) U.S. Cl. ................................................. 405/129.9
(58) Field of Classification Search ............. 405/129.9, 405/129.95
   See application file for complete search history.

(56) References Cited

U.S. PATENT DOCUMENTS

| | | | |
|---|---|---|---|
| 4,507,127 A | 3/1985 | Hirose | |
| 5,354,349 A * | 10/1994 | Inoue | ................................. 71/9 |
| 5,855,664 A * | 1/1999 | Bielecki et al. | ........... 405/129.9 |
| 5,960,559 A | 10/1999 | Brunnmair et al. | |
| 6,058,619 A | 5/2000 | Krebs et al. | |
| 6,174,472 B1 | 1/2001 | Johnson et al. | |
| 6,316,246 B1 | 11/2001 | Hazaka | |

* cited by examiner

Primary Examiner—John Kreck

(57) ABSTRACT

Landfill daily cover and general ground cover is produced from sewer sludge and/or municipal solid waste by adding an amount of cellulose material to form a de-watered stream having a water content of about 55% or less by weight. The de-watered stream is then treated to reduce its pathogen concentration, preferably by first grinding the de-watered stream to form an average 10–50 mesh particle size stream that is then heat treated to further reduce the water content to 20%, preferably 5%–15%, by weight. To produce a daily cover a flame retardant material is added in amounts to qualify the end product as landfill daily cover.

17 Claims, 2 Drawing Sheets

METHOD TO PRODUCE LANDFILL DAILY COVER FROM SEWER SLUDGE AND MSW

BACKGROUND OF THE INVENTION

1. Field of the Invention

This invention relates in general to methods for treating sewer sludge, or a mixture of sewer sludge and municipal solid waste, to produce landfill daily cover, general ground cover, or other type biosolids.

2. Prior Art

Sewer sludge, the residue generated during treatment of domestic sewage, has beneficial plant nutrients and soil conditioning properties. However, it may also contain pathogenic bacteria, viruses, protozoa, parasites, and other microorganisms that can cause disease. For this reasons most industrialized countries, including the United States, regulate the ways in which sewer sludge can be disposed. Under these regulations sewer sludge must be treated to reduce the risk of disease from the pathogens in the sewer sludge, as well as reduces the odor problems caused by sewer sludge.

Because of the current high cost of treatment of sewer sludge to permit its use on land having a high potential for public exposure, such as use on lawns, golf courses and similar uses, the most common method for handling disposal of municipal solid waste and sewer sludge is through disposal in landfills. However, even this use of sewer sludge faces environmental regulatory requirements that impact the cost to dispose of sewer sludge through use of landfills. One such regulation designed to reduce environmental concerns relating to landfills is the EPA mandated recycling quotas; i.e., the amount of material the landfill is allowed to take in each day depends upon the percent of the material that can be recycled. Thus, a certain portion of the sewer sludge must be treated in a manner that permits it to be recycled for uses other than landfill in order that a landfill can accommodate the constant daily flow of new incoming sewer sludge. To meet the recycling requirements is expensive, and requires in most cases large capital investments in special container and trucks, as well as increased operating costs. Methods to reduce the costs associated with these recycling requirements would be a significant benefit to the landfill operators.

Another particular problem encountered by landfill operators is the handling of sewer sludge that is to be disposed in the landfill. Typically sewer sludge makes up 10% of the material received daily by a landfill for disposal. Sewer sludge often contains as much as 70% water and has to be de-watered before it can be disposed in the landfill. In addition, because of the composition of sewer sludge significant odor problems occur. Still further, because sewer sludge is not easily packed it sticks to the equipment located at the landfill that results in further odor problems. Methods that can treat the sewer sludge that more easily and less expensively make it suitable for disposal in the landfill, as well as minimize the odor problems would be a significant benefit to the landfill operators.

A third problem encountered in the operation of landfills is the regulatory requirement that each day the newly deposited material disposed in the landfill must be covered with material meeting EPA requirements. This material is commonly referred to in the industry as daily cover. At present most landfills utilize soil that in many cases has to be trucked in and then spread over the newly deposited material. Under current regulations the use of soil requires that a six inch layer of soil be used to cover the sewer sludge that has been disposed in the landfill each day. Alternatively, ground cellulose containing flame retardant can be used. In some landfills a tarpaulin is rolled over the newly deposited material at the end of each day and then rolled back at the beginning of the next day. Each of these methods is expensive. Less expensive solutions to this problem would also be of significant benefit to the landfill operators.

OBJECTS AND SUMMARY OF THE INVENTION

Therefore, one object of this invention is to provide improved methods to treat certain portions of the municipal garbage and sewer sludge delivered to a landfill in a manner that permits its use as the daily cover.

Another object of this invention is to provide improved methods to treat sewer sludge delivered to a landfill that reduces the odor problem associated with the disposal of the sewer sludge.

Still another object of this invention is to provide methods to treat the municipal garbage and sewer sludge that decrease the operating expenses associated with the disposal of these materials.

Another object of this invention is to provide a method for treating sewer sludge and/or certain portions of municipal garbage to form a material that can be used as a ground cover.

Other objects and advantages of this invention shall become apparent from the ensuing descriptions of the invention.

Accordingly, in one embodiment this invention comprises a method for treatment of landfill material such as municipal garbage (also referred to in the industry as municipal solid waste or MSW) and sewer sludge, to produce the daily cover needed by the landfill. In accordance with this method, if necessary, the landfill material is first de-watered to reduce its water content to about 65% or less by weight. If possible this can be achieved by gravity draining the landfill material. The de-watered landfill material is then mixed with a fibrous cellolosic material to further reduce its water content by weight. The amount of fibrous cellolosic material is preferably sufficient to form a fiber containing stream having a water content between 50%–60%, preferably about 55%, by weight. This fiber containing stream is then treated to reduce the pathogens in the stream to a level that will meet the regulatory requirements for the desired use of the resulting material. A preferred method for killing many of the pathogens is to first grind the fiber containing stream to better expose the pathogens for subsequent destruction by subjecting the stream at temperatures and under other conditions necessary to kill the desired amount and type of pathogens. This pathogen killing treatment step preferably is conducted by first grinding the fiber containing stream to produce a ground fiber containing stream. It is preferred that the average particle size of the ground fiber stream is 10 to 50 mesh to increase the surface area of the particles. The ground fiber stream is then subjected to heat under conditions that reduce the water content of about 20% or less, preferably about 5%–15%, and if the end product is to be used as ground cover, most preferably about 10% or less, by weight. If the final product is to be daily cover, then a flame retardant material, such as gypsum, boric acid, silicon borate, or similar material, is added to the ground, dried fiber stream. The amount of flame retardant to be added is an amount to produce a product qualifying as a daily cover under EPA regulations.

BRIEF DESCRIPTION OF THE DRAWINGS

The accompanying drawings illustrate a preferred embodiment of this invention. However, it is to be understood that these embodiments are not intended to be exhaustive, nor limiting of the invention. They are but examples of some of the forms in which the invention may be practiced.

PREFERRED EMBODIMENTS OF THE INVENTION

Without any intent to limit the scope of this invention, reference is made to the figures in describing the preferred embodiments of the invention.

Under current EPA regulations a landfill must recycle a portion of the material it receives rather than depositing it directly in the landfill. In addition a landfill operator must cover each day the material that is deposited in the landfill. It has been discovered that both environmental requirements can be met by converting a portion of the sewer sludge and/or the MSW into a material that meets the EPA regulations as a Class B material that has the characteristics permitting its use as daily cover. It has also been discovered that by varying the method of the invention the sewer sludge and/or MSW can be treated to result in material that meets the EPA regulations as a Class A material that has the characteristics permitting use as ground cover.

Figure 1:
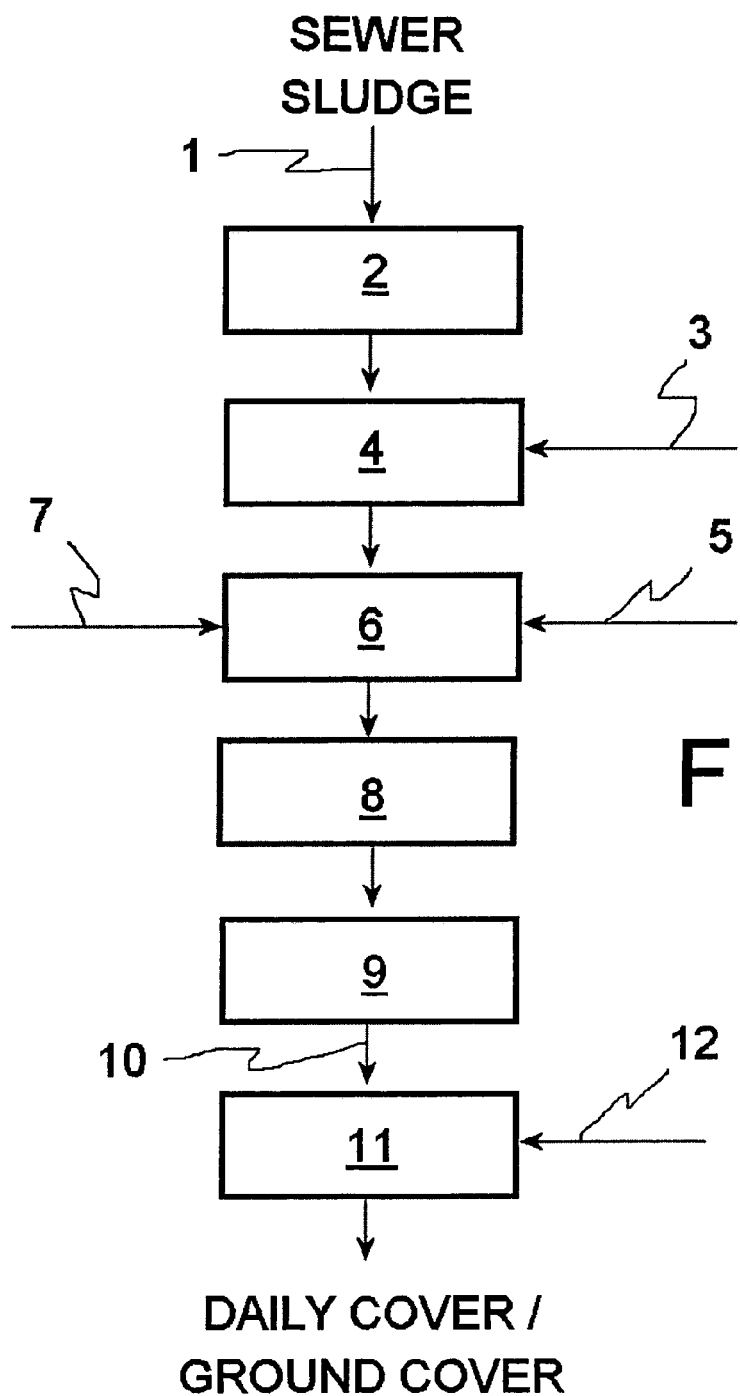
FIG. 1 is a schematic illustrating a preferred method of producing landfill cover from sewer sludge.

Referring now to FIG. 1, sewer sludge that typically contains about 70% water by weight is submitted to a de-watering step. The de-watering can be achieved by introducing the sewer sludge via inlet line 1 into any of many known apparatus such as screw presses or dryers 2, or by the addition of various de-watering compounds, or by a combination of these different methods. In some instances the de-watering can be achieved by positioning the sewer sludge on a sloped surface to permit water to drain from the sewer sludge. In a preferred embodiment, compounds having both a de-watering, as well as de-odorizing characteristic are added via line 3 and mixed with the sewer sludge in vessel 4. Such compounds include hydrogen peroxide, ammonia, ammonia nitrate, quick lime, or other similar compounds. Regardless of the method or methods used, it is preferred that the water content of the sewer sludge be reduced to at least about 65% by weight, and more preferably to about 60% or less by weight.

To the partially de-watered sewer sludge a relatively dry fibrous cellulosic material is added through line 5 and mixed in vessel 6 to produce a fiber containing stream. Depending on the size and construction of vessel 3, this step could take place in vessel 3 and eliminate the need for vessel 6. Such fiber containing materials include arboreal waste, agricultural waste, dried municipal solid waste (MSW), or mixtures thereof. Examples of suitable arboreal waste include sawdust, wood shavings, wood flower, and tree bark. Examples of suitable agricultural waste includes bagasse, ground grape leaves, ground sugar cane leaves, orange pulp, chicken litter, lawn waste, garden waste, straw, and other plant waste from agricultural operations. The selection of which fibrous cellulosic material or combination to use is determined in part by availability and cost, as well as the ultimate use of the end product. If the end product is to be used as a ground cover, then the use of a fibrous cellulosic material having better soil nutrient value may be desirable.

The fiber containing stream is next treated to reduce the concentration of the various pathogens contained in the stream. This step can be achieved by a variety of different methods. One method would include the addition via line 7 of a disinfectant or other compound or compounds known to kill the pathogens existing in the sewer sludge and MSW into vessel 6. However, it is preferred that the fiber-containing stream be treated by the combination of first grinding the fibrous cellulosic material in grinder 8 and then heating the ground material in drier 9. If this method is used, then the amount of fibrous cellulosic material to be added is determined by the percent of water content desired in the resulting mixture. It is preferred that the resultant water content be lowered sufficiently to permit easier grinding of the mixture. In a preferred embodiment the water content in the mixture will be lowered to at least about 55% by weight. In a preferred embodiment the fibrous cellolosic material is dry bagasse. In this embodiment for each ton of de-watered sewer sludge, 0.1 to 0.2 tons of bagasse will be added to achieve the preferred water content of 55% by weight. This fiber containing mixture is then ground to facilitate exposing the pathogens for destruction by heat. It has been found that if the average particle size in the ground fiber stream is 10–50 mesh, then by controlling the temperature and treatment time to reduce the water content to 20% or less, by weight, will sufficiently reduce the pathogen concentration to permit the resultant product to be used as daily cover.

There are a variety of known apparatus that can be used to achieve this further de-watering. A preferred means to heat the ground fiber from grinder 8 is through the use of a flash drier 9. Depending on the selection of equipment it is possible that both the grinding and heating could be achieved simultaneously. The ground fiber is exposed to sufficiently high heat for a sufficiently long period of time to meet the regulatory requirements that depend in part on the ultimate use of the end product. Current EPA acceptable combinations of temperature and heat exposure time ranges are set forth in 40 CFR §503.32(a)(3). If the desired final product is to used as daily cover, then the resulting dried, ground fiber containing material is introduced via line 10 into vessel 11 and mixed with sufficient flame retardant material, such as gypsum, boric acid, silicon borate or similar compound introduced via line 12 to produce a non-flammable product that is now usable daily cover or as a ground cover depending on the pathogen killing conditions utilized. In a preferred embodiment for each ton of dried, ground fiber containing material, 0.30 to 0.60 tons of the flame retardant material will be added to produce a suitable daily cover.

From this method for each ton of sewer sludge utilized as feedstock about 0.75 to 0.85 tons of daily cover can be produced. Conversion of the sewer sludge into daily cover qualifies as a recycling under current EPA regulations and thus permits a landfill to accommodate more daily tonnage of waste. In addition, capital and operating costs associated with providing daily cover are significantly lowered resulting in significant cost savings. This method provides the additional advantage of taking the most odor causing material in a landfill and converting it a daily cover that does not generate the odor problem.

Figure 2:
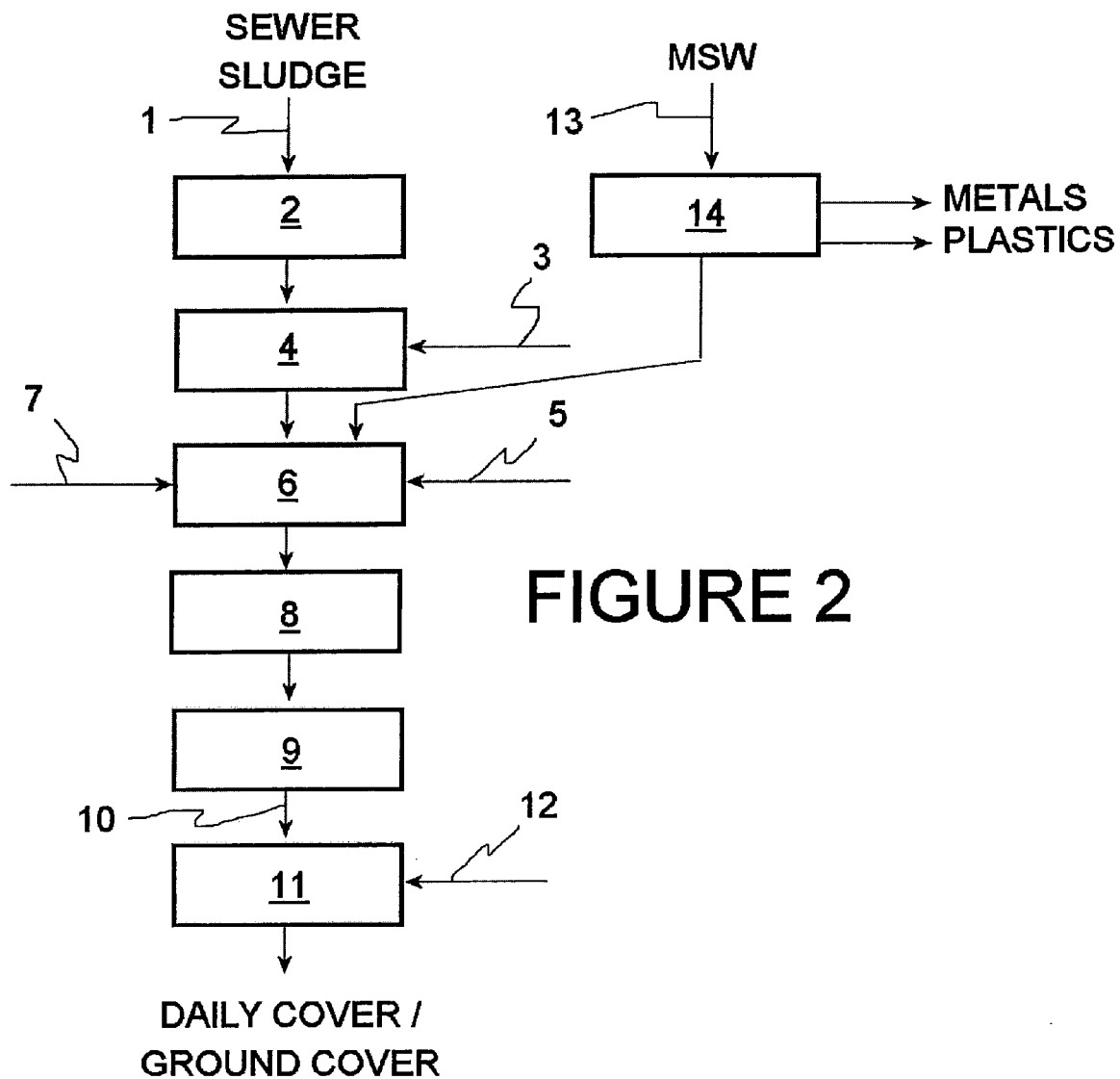
FIG. 2 is a schematic illustrating a preferred method of producing landfill cover or a general ground cover from a combination of municipal garbage and sewer sludge.

In an alternate preferred embodiment illustrated in FIG. 2, both sewer sludge and MSW are utilized to produce an end product that can be used as a daily cover or as an EPA designated Class A ground cover. In this process the MSW is introduced via line 13 to hydroclave 14, or other similar known device, to remove the metals and plastic components that may be in the MSW. This results in a substantially metal and plastic free MSW product. The resulting MSW product material is then transported via line 15 to blender 6 where it is mixed with the de-watered sewer sludge, as described above, and if desired with other cellulosic material introduced via line 5, from vessel 4 to produce a mixture that is then ground in grinder 8 and dried in flash drier 9, as described above. In a preferred embodiment for each ton of sewer sludge, 0.25 to 0.50 tons of MSW product, or combination of MSW product and other cellulosic material, is blended in vessel 8 with the sewer sludge, and then dried in drier 9, as described above, to produce a ground, dried fiber containing material. If the ground, dried fiber containing material is to be used as daily cover, it is then mixed with a fire retardant material, such as gypsum, boric acid, silicon borate, or similar compounds. In a preferred embodiment for each ton of ground, dried fiber containing material, 0.30 to 0.60 tons of flame retardant material is added and mixed in vessel 11.

If the ground, dried fiber containing material is to be used as a ground cover, then, although one can be added, it is not necessary to add a fire retardant material. The resulting product has a greater nitrogen content that facilitates grass growth that permits it to be used as a ground cover for golf course fairways or residential lawns.

There are of course other alternate embodiments which are obvious from the foregoing descriptions of the invention which are intended to be included within the scope of the invention as defined by the following claims.

What is claimed is:

1. A process for the treatment of landfill material containing sewer sludge to produce daily cover comprising the steps of:
    (a) adding an amount of fibrous cellulose material to a predetermined portion of landfill material to form a fiber containing stream having a water content of about 65% or less by weight and containing pathogens;
    (b) reducing the water content in the fiber containing stream to about 20% or less by weight under conditions killing a sufficient amount of the pathogens and reducing the vector attraction to less than an amount required to produce daily cover; and
    (c) adding a fire retardant to the reduced water content stream in a predetermined amount to produce the daily cover.

2. A process according to claim 1 wherein the fibrous cellulose material is selected from a group consisting essentially of arboreal waste, agricultural waste, municipal solid waste, or mixtures thereof.

3. A process according to claim 2 wherein the arboreal waste is selected from a group consisting essentially of sawdust, wood shavings, wood flower, tree bark, or combinations thereof.

4. A process according to claim 2 wherein the agricultural waste is selected from a group consisting essentially of bagasse, ground grape leaves, orange pulp, chicken litter, lawn waste, garden waste, straw, other plant waste from agricultural operations, or mixtures thereof.

5. A process according to claim 2 wherein the agricultural waste comprises bagasse.

6. A process according to claim 1 further comprising adding a de-odorizing compound to the landfill material prior to adding the fibrous cellulose material.

7. A process according to claim 1 wherein the step of killing the pathogens in the fiber containing stream comprises grinding the fiber containing stream to produce a ground fiber containing stream having average particle size of about 10 to 50 mesh and subjecting the ground fiber containing stream to heat at sufficient temperatures and for a sufficient period of time to effect killing a sufficient amount of the pathogens necessary to produce the daily cover.

8. A process according to claim 7 wherein the average size is about 20 mesh.

9. A process according to claim 7 wherein the temperatures and the period of time are sufficient to reduce the water content of the ground fiber containing stream to about 15% or less by weight.

10. A process according to claim 9 wherein the water content is about 10% or less by weight.

11. A process according to claim 1 wherein the weight ratio of the landfill material to the fibrous cellulose material is about 1.0:0.1 to about 1.0:0.2.

12. A method for the operation of a landfill used to dispose of sewer sludge comprising the steps of:
    (a) receiving sewer sludge containing pathogens,
    (b) mixing a fibrous cellulose material to at least a portion of the sewer sludge to form a fiber containing stream having a water content less than 65% water by weight,
    (c) reducing the water content of the fiber containing stream to about 20% or less by weight under conditions killing a sufficient amount of the pathogens and reducing the vector attraction to less than an amount required to produce daily cover, and
    (d) spreading the daily cover over a least a portion of a surface of the landfill.

13. A method according to claim 12 further comprising grinding the fiber containing stream to produce a ground fiber containing stream having average particle size of about 10 to 50 mesh.

14. A method according to claim 12 wherein the water content of the fiber containing stream is reduced to about 15% or less by weight.

15. A method according to claim 12 wherein the water content of the fiber containing stream is reduced to about 10% or less by weight.

16. A method according to claim 13 further comprising mixing a fire retardant with the daily cover prior to spreading.

17. A method according to claim 13 further comprising mixing a de-odorizing compound to the portion of the sewer sludge.

* * * * *